(12) United States Patent
Guerin et al.

(10) Patent No.: US 11,646,048 B2
(45) Date of Patent: May 9, 2023

(54) LOCALIZATION OF SOUND SOURCES IN A GIVEN ACOUSTIC ENVIRONMENT

(71) Applicant: ORANGE, Paris (FR)

(72) Inventors: Alexandre Guerin, Chatillon (FR); Srdan Kitic, Chatillon (FR); Arnaud Lefort, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 213 days.

(21) Appl. No.: 16/973,972

(22) PCT Filed: Jun. 7, 2019

(86) PCT No.: PCT/FR2019/051377
§ 371 (c)(1),
(2) Date: Dec. 10, 2020

(87) PCT Pub. No.: WO2019/239043
PCT Pub. Date: Dec. 19, 2019

(65) Prior Publication Data
US 2021/0256990 A1      Aug. 19, 2021

(30) Foreign Application Priority Data
Jun. 13, 2018   (FR) ........................ 1855188

(51) Int. Cl.
*G10L 25/51*      (2013.01)
*G01S 3/80*       (2006.01)
(Continued)

(52) U.S. Cl.
CPC ............ *G10L 25/51* (2013.01); *G01S 3/8006* (2013.01); *G10L 21/14* (2013.01); *G10L 25/18* (2013.01);
(Continued)

(58) Field of Classification Search
None
See application file for complete search history.

(56) References Cited

U.S. PATENT DOCUMENTS 9,820,043 B2 * 11/2017 Kanamori .......... G10L 21/0232
10,901,063 B2 * 1/2021 Helwani ............... G01S 3/8083
2012/0195436 A1 8/2012 Nakadai et al.

FOREIGN PATENT DOCUMENTS

EP      0795851 A2    9/1997

OTHER PUBLICATIONS

English translation of the Written Opinion of the International Searching Authority dated Aug. 13, 2019 for corresponding International Application No. PCT/FR2019/051377, filed Jun. 7, 2019.
(Continued)

*Primary Examiner* — Paul W Huber
(74) *Attorney, Agent, or Firm* — David D. Brush; Westman, Champlin & Koehler, P.A.

(57) ABSTRACT

Processing acoustic signals to detect sound sources in a sound scene. The method includes: obtaining a plurality of signals representative of the sound scene, captured by a plurality of microphones of predefined positions; based on the signals captured by the microphones and on the positions of the microphones, applying a quantization of directional measurements of sound intensity and establishing a corresponding acoustic activity map in a sound source localization space, the space being of dimension N; constructing at least one vector basis of dimension less than N; projecting the acoustic activity map onto at least one axis of the vector basis; and searching for at least one local peak of acoustic activity in the map projection, an identified local peak corresponding to the presence of a sound source in the scene.

17 Claims, 5 Drawing Sheets

(51) Int. Cl.
*G10L 21/14* (2013.01)
*G10L 25/18* (2013.01)
*G10L 25/21* (2013.01)
*H04R 1/40* (2006.01)
*H04R 3/00* (2006.01)

(52) U.S. Cl.
CPC .............. *G10L 25/21* (2013.01); *H04R 1/406* (2013.01); *H04R 3/005* (2013.01)

(56) References Cited

OTHER PUBLICATIONS

International Search Report dated Aug. 2, 2019 for corresponding International Application No. PCT/FR2019/051377, dated Jun. 7, 2019.

Written Opinion of the International Searching Authority dated Aug. 2, 2019 for corresponding International Application No. PCT/FR2019/051377, filed Jun. 7, 2019.

\* cited by examiner

US 11,646,048 B2

LOCALIZATION OF SOUND SOURCES IN A GIVEN ACOUSTIC ENVIRONMENT

CROSS-REFERENCE TO RELATED APPLICATIONS

This application is a Section 371 National Stage Application of International Application No. PCT/FR2109/051377, filed Jun. 7, 2019, the content of which is incorporated herein by reference in its entirety, and published as WO 2019/239043 on Dec. 19, 2019, not in English.

FIELD OF THE DISCLOSURE

The present invention relates to the field of audio or acoustic signal processing.

More particularly, it relates to the localization of simultaneous sound sources in at least two dimensions (azimuth/elevation), or "sound mapping" as used below.

Such localization can be carried out based on a multi-channel sound capture, which may be in the form of a flat or spherical grid.

BACKGROUND OF THE DISCLOSURE

There are many applications for the mapping of sound scenes.

These include, for example, home voice assistants where localization of the speaker is essential to cleaning up the voice command signal by taking advantage of the focusing capabilities of the antenna.

Simultaneous localization of noise source(s) would allow further improving the noise suppression processing by using suitable spatial-frequency filters.

For virtual reality content (for example 360/VR), the preferred sound capture for creating such content is carried out according to the technique known as "surround sound" or "ambisonic". It allows providing a 3D representation of the sound field and thus guaranteeing audio-visual consistency during user movements. The creation of this content requires editing, which is based on knowing the position of the sources in the content in order to strengthen/attenuate these sources, move them, or take other actions. Furthermore, new generation audio coders must support data in surround sound (3D spherical) format, hereinafter called "ambisonic" format. Similarly, the 3GPP EVS future codec IVAS (for Immersive Voice and Audio Services) must be able to compress data in ambisonic format. Real-time mapping can be used to natively compress these 3D scenes more efficiently or more faithfully, for example by focusing on the sources of interest.

Moreover, in videoconferencing, an array of microphones is coupled with one or more wide-angle cameras. The microphone array can be used to spatially capture the sound scene with a view to reproducing it at a remote site via a set of speakers. The microphone array can also be used to control zooming the camera in on the speaking party by detecting and localizing the active sound source. It is therefore desirable to have a near-instantaneous detection that is robust to acoustic conditions, and tracking of the speaking party within the space, which would make it possible to follow said party visually. On the other hand, the detection of several simultaneous sources also makes it possible to adapt the behavior to the complexity of the sound scene, such as activating a wide-angle view if several sources are active simultaneously. Finally, localization of the source makes it possible to calculate spatial filters (by a technique known as "beamforming" for example) to clean the useful source by reducing the ambient noise.

We therefore more generally consider a sound scene composed of Isources, which emit signals $s_i(t)$, $1 \leq i \leq I$. The sound sources are located using an array of C sensors (typically microphones), for which the captured signals $x_j(t)$, $1 \leq j \leq C$ are given by:

$$x_j(t) = \sum_{i=1}^{I} \sum_{\tau \geq 0} a_{ij}(\tau) s_i(t - \tau)$$

where $a_{ij}(\tau)$ is, by definition, the impulse response linking source i to sensor j, representative for example of the reflections generated by the acoustics of the sound environment.

If we are not interested in the distance from a source to the array, each source can be identified by its polar coordinates (azimuth, elevation) relative to the array, these coordinates being denoted $(\theta_i, \varphi_i)$, $1 \leq i \leq I$, as illustrated in FIG. 1 in which the array of microphones is referenced ANT.

The localization methods are based on multi-channel sound capturing, in the form of an array composed of several microphones. Depending on the application, the arrays may be linear (localization within a half-plane only), planar (localization within a half-space), or spherical.

A first family of localization methods exploits the time difference of arrival (or TDOA) between sensors, to deduce the direction of arrival (or DOA) of the rising edge of the main wave, a direction directly linked to the position of the dominant source in the chosen time window of observation.

These TDOAs are conventionally estimated by inter-sensor cross-correlation calculation (method referred to as "GCC" for Generalized Cross-Correlation).

Limited to the localization of a single source, the GCC method has been extended to the simultaneous localization of several sources by operating in frequency sub-bands, exploiting the frequency parsimony of the sources, and therefore assuming that one source is preponderant in each sub-band.

The technique known as "MUSIC" (for Multiple Signal Classification) allows, among other things, simultaneously identifying the direction of arrival of different sources, provided that the number of sources is less than the number of sensors. By assuming that the number of sources can be estimated a priori, the MUSIC method carries out an exhaustive search for directions of arrival while minimizing a criterion of correlation with the vector subspace of the noise.

Other approaches such as "SRP-Phat" (for Steered-Response Power-Phase Transform) exploit the beamforming capabilities of the capturing array to estimate, by an exhaustive search in all spatial directions, those from which the maximum energy is coming, these directions generally corresponding to the positions of the sources.

Finally, methods such as "DUET" (for Degenerate Unmixing Estimation Technique) or DEMIX (Direction Estimation of Mixing matriX) calculate a physical localization criterion on short time frames. This criterion is generally estimated by sub-bands after applying a short-time fast Fourier transform (FTT), which makes it possible to exploit the spectral parsimony of the sound sources and therefore to make the assumption that only one source is present in each sub-band.

The indices of several consecutive frames are gathered together and then quantized on a spatial grid in order to produce a histogram representing an activation map for each spatial direction. This histogram is then processed by a grouping or "clustering" technique, for example using K-means algorithms, the centers of the clusters representing the position of the sources.

The main limitations of the state of the art are linked to the compromise between computing cost and robustness to reverberation, which makes them difficult to use in real time under real acoustic conditions.

By its very construction, the GCC method is restricted to identifying DOA (direction of arrival of the sound) from one source at a time. However, it is very sensitive to acoustic conditions. Indeed, reverberation strongly disrupts the estimation of the delay between sensors. The method requires a large window size (of about a second) to estimate the cross-correlation between array sensors. The extension to simultaneous multi-sources by a subdivision into sub-bands requires a reasonable spectral resolution so that the assumption of frequency parsimony is satisfied (in practice less than 100 Hz).

In practice, this amounts to working with windows of several seconds, which is not compatible with sources that are moving (even slightly), nor with applications which require near-instantaneous detection of intermittent sources such as speech.

In theory, SRP-type methods are able to identify several simultaneous sources. Although the performances are acceptable in an anechoic environment, it is quite a different story in a reverberant environment. Indeed, reflections and reverberation are viewed as sources of near-isotropic noise. Thus, even in weakly reverberant environments, the energy map generated by SRP-type methods is "full" and makes it difficult to identify zones corresponding to the emitting sources. Because of reverberation, the angular resolution of these methods is low and detection of simultaneous sources is only possible if the angular difference between the sources is large, even with arrays of high spatial resolution.

Methods based on histograms of sub-band localization criteria such as DUET or DEMIX turn out to be relatively complex because of the processing to achieve grouping or "clustering", especially in two or three dimensions. This computing cost is amplified by the fact that the number of sources is unknown. In practice, it is necessary to perform clustering under different assumptions concerning the number of sources in order to decide a posteriori on the most probable configuration, hence the increase in complexity of the algorithm.

A rapid technique of low complexity is desired.

SUMMARY

The present invention improves this situation.

For this purpose, it proposes a method for processing acoustic signals in order to detect one or more sound sources in a sound scene, the method comprising:
  obtaining a plurality of signals representative of the sound scene, captured by a plurality of microphones of predefined positions,
  based on the signals captured by the microphones and on the positions of the microphones, applying a quantization of directional measurements of sound intensity and establishing a corresponding acoustic activity map in a sound source localization space, said space being of dimension N.
In particular, the method further comprises:
  constructing at least one vector basis of dimension less than N,
  projecting the acoustic activity map onto at least one axis of the vector basis, and
  searching for at least one local peak of acoustic activity in the map projection, an identified local peak corresponding to the presence of a sound source in the scene.

Thus, due to said projection, the invention makes it possible to reduce the dimension N of the acoustic activity map to a body of study of reduced dimension N-P, which advantageously makes it possible to reduce the complexity of the processing and to save the computer resources required for the processing.

For example, the DUET or DEMIX techniques described above can be used to obtain histograms to use to construct said acoustic activity map, with some improvements as described below to increase the robustness of the processing for the detection or even the localization of sources.

Already, typically, the search for a local peak of acoustic activity in the map projection may comprise processing which groups by a clustering technique as described above, but only processing the map projection(s) and not the complete map, and then identifying the cluster centers as possible positions of sources.

In one embodiment, the signals are obtained over successive frames each of a duration corresponding to a predetermined observation period, and the establishment of the acoustic activity map comprises:
  collecting indices of several consecutive frames, and
  quantizing said indices on a grid of the N-dimensional space.

Such an embodiment, over several successive frames, makes it possible to detect an active source, generally over several observation periods (or frame durations).

For example, an observation period of between 10 and 50 ms may be selected.

In addition to detecting source(s), it is possible to determine the direction of arrival of the source, as follows:
  from at least one coordinate of the local peak (or several coordinates of the local peak if the dimension of the vector basis is greater than 1), we estimate in said vector basis at least a first direction of arrival of the sound coming from the sound source corresponding to this local peak ("first" used here to mean "initial").

As we will see further below with the example of an ambisonic representation of signals initially captured by the microphones, it is possible to make several projections of the map on as many vector bases. In the example illustrated below, these bases can be of dimension 1 (azimuth angle or elevation angle). It is also explained further below why the projection based on azimuth angles is more reliable, in an acoustic environment such as a hall, than the projection based on elevation angles (due to acoustic reverberations on the floor and ceiling).

Thus, in this case in particular, it can be based on the search for a local peak in the map projection onto a particular vector basis (of dimension N-P), for a first rough localization of the source, then searching more precisely for the sources in the complete acoustic map (of dimension N) in a region corresponding to this first rough localization.

Thus, the method may further comprise:
  from the coordinate of the local peak in the vector basis, refining the estimate of the direction of arrival of the sound by processing the acoustic activity map in only one sector of the N-dimensional space, including said first direction of arrival.

In one embodiment, the method comprises subdividing the signals captured by the microphones, into frequency sub-bands.

Such an embodiment already makes it possible to have more data, and in particular to take advantage of the parsimony of sources in order (to hope) to have only one source in each band (thus with information on the direction of arrival of sound from the less noisy sources).

In one embodiment, a weighting is applied to the quantization of the directional measurements of sound intensity, in a manner proportional to an acoustic energy estimated for each measurement to be quantized. Such an embodiment makes it possible to favor the high-energy frequency bands and/or the successive observation times (therefore the frames) which have high energy, which illustrates the presence of a source.

For example, we can estimate acoustic energy per frame and apply a weighting of higher weight to the quantization of directional measurements of sound intensity coming from the frames having the most energy. In this case, a "time weighting" is applied.

Additionally or alternatively, we can estimate an energy per sub-band in order to identify sub-bands having the most acoustic energy and to apply a weighting of higher weight to the quantization of directional measurements of sound intensity having a greater representation in the sub-bands having the most energy. In this case, a "frequency weighting" is applied.

As indicated above, the microphones may be arranged to capture sound signals defined in a basis of spherical harmonics in an ambisonic representation. We then construct at least one vector basis of dimension one, among:
- a first basis defining values of the azimuth angle of the direction of arrival of the sound, and comprising an azimuth angle axis onto which the acoustic activity map is projected, and
- a second basis defining values of the elevation angle of the direction of arrival of the sound, and comprising an elevation angle axis onto which the acoustic activity map is projected.

Such an embodiment already makes it possible to have robust detection, in particular in the azimuth as presented in the examples below. In particular, as presented in the exemplary embodiments below, the order of the ambisonic representation does not need to be high in order to implement such an embodiment.

In particular, the ambisonic representation can be of order one (or more), and at order 1 the azimuth and elevation angles are respectively defined as a function of four first-order ambisonic components W, X, Y, Z, as follows:

$$\begin{cases} \theta = \arctan\left(\frac{f(WY^*)}{f(WX^*)}\right) \\ \varphi = \arctan\left(\frac{g(WZ^*)}{\sqrt[2]{\|g(WX^*)\|^2 + \|g(WY^*)\|^2}}\right) \end{cases} \quad (5)$$

$f$ and $g$ here are possible functions among: identity, (statistical) expectation, the real part of a complex number, or a combination of some or all of these functions.

Typically, in the case of components in the time domain, we have $f(x)=E\{x\}$: the expectation E is calculated, by applying the ergodicity hypothesis, on time samples of variable x which then represents the samples of the frame considered.

In the case of complex components resulting from a Fourier transform, we have $f(x)=Re\{x\}$: the samples x, for a given frequency, then come from different frames and we apply the "real part" operator to them in order to estimate the active part of the intensity vector which carries the propagation information for the sound field at the frequency considered.

Of course, the two functions, expectation and real part, may also be combined if necessary.

In addition, the functions $f$ and $g$ for the representations in the above bases, azimuth angle and elevation angle, may respectively be the same or different. For example, function $f$ may be the real part Re{ } in complex samples resulting from a Fourier transform, while function g may be the combination E{Re{ }}, where the expectation is over different frames in order to reduce variance in the observations which may turn out to be noisy, in particular due to reflections on the floor and ceiling.

To avoid giving too much importance to reverberations and to the corresponding diffuse fields, we can also estimate a planarity criterion for the sound wave coming from a source as a function of the ambisonic components X, Y, Z and W, as follows:

$$c_{op} = \frac{f(\|X\|^2) + f(\|Y\|^2) + f(\|Z\|^2)}{3f(\|W\|^2)}$$

where $f$ is a function of the type defined above.

In addition, a weighting can then be applied to the quantization of the directional measurements of sound intensity, in a manner proportional to the planarity criterion $c_{op}$ for each measurement to be quantized.

It is also possible to provide for the application of a low-pass frequency filter to the projection of the acoustic activity map.

In fact, as the map projections are generally noisy in the presence of reverberation, an erroneous detection of multiple sources for example is thus avoided.

As the exemplary embodiments were able to show that detection along the azimuth angle is more robust than along the elevation angle, in one embodiment the estimation of the direction of arrival of the sound can be refined based on the coordinate of the local peak identified in the first basis defining the azimuth angle values (and we then search for a more refined position of the source in a sector around the azimuth coordinate where the map projection shows a local peak).

The invention also relates to a computer program comprising instructions for implementing the above method, when these instructions are executed by a processor.

It also relates to a device comprising:
- an input interface for receiving signals captured by microphones of predetermined positions,
- a processing unit for implementing the above method, and
- an output interface for delivering at least one source detection signal.

BRIEF DESCRIPTION OF THE DRAWINGS

Other features and advantages will become apparent from reading the following detailed description of some non-limiting embodiments, and from examining the accompanying drawings in which.

DETAILED DESCRIPTION OF ILLUSTRATIVE EMBODIMENTS

Figure 1:
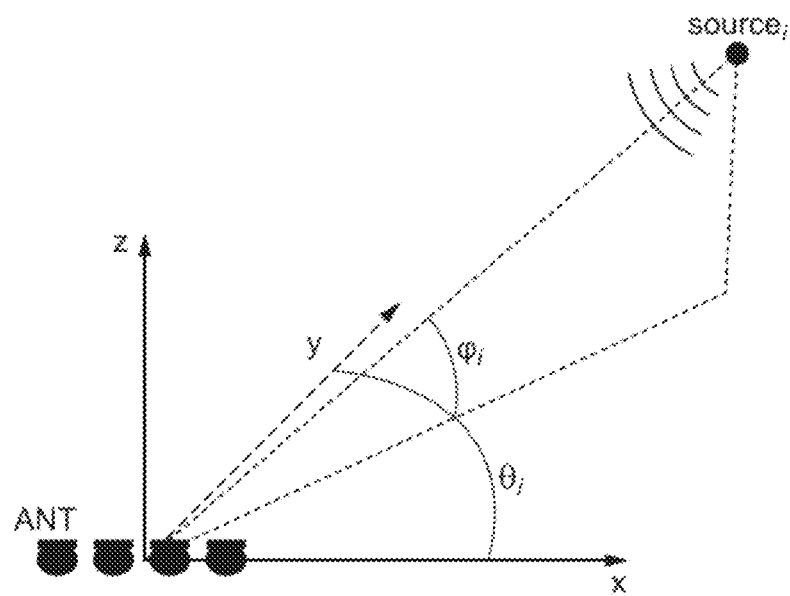
FIG. 1 illustrates the relative positions of a source and an array of microphones, and the notation of the associated coordinates (of the azimuth and elevation in particular)

The following focuses on localization in a space of dimension M≥2, using the same principle as methods based on histograms such as DUET or DEMIX presented below, but greatly reducing their complexity.

For a given time window of observation of duration T, a set of descriptors D is calculated. Preferably, these descriptors are calculated over short time frames based on a decomposition into sub-bands after application of a time-frequency transformation—generally an FFT—to take advantage of the frequency parsimony of the signals (such as speech signals for example).

These descriptors, correlated with localization of the sound sources present in the sound field, make it possible to obtain a series of estimates, generally noisy, of the directions of arrival (DOA) of the sources $s_i$, $1 \leq i \leq I$.

These estimates are then quantized according to a grid of size K of the space containing the sources. In the case of ambisonic capture for example, where it concerns locating sources according to their polar coordinates (azimuth, elevation), it is possible to produce a grid, generally based on polygons, of the sphere with a certain resolution in the azimuth and elevation, it being possible to represent each cell by the "center" of the associated polygon and identify it by a pair of angles $(\Theta_k, \varphi_k)$, $1 \leq k \leq K$.

On the basis of this grid, a histogram h of the estimated locations is deduced.

In the case of an ambisonic type array for example, calculation of the descriptors yields D pairs $(\hat{\theta}_d, \hat{\varphi}_d)$, $1 \leq d \leq D$, from which is deduced a histogram $h(\Theta_k, \varphi_k)$, $1 \leq k \leq K$, in practice with D>>K.

Then, rather than applying the clustering processing directly in this M-dimensional space as in the conventional DUET or DEMIX techniques (an operation which usually turns out to be complex), we propose here to project this histogram onto one-dimensional axes corresponding to a basis of the localization space. In the ambisonic case, this histogram could be projected for example along two axes Θ and φ.

Based on the projections along the different axes, the local maxima of the projected histograms are searched for, which are simple one-dimensional functions.

The advantage of this projection is to:
reduce the complexity of the algorithm compared to a search in at least two dimensions, and
improve the robustness of the detection to noise and to reverberation: by projecting the positions of the sources along axes of the space, a larger amount of data is in fact available for the search in a single direction, which has the effect of reducing the variance of the DOA estimator in this direction.

In practice, this "surplus" of data can be exploited to improve the responsiveness of the system to the detection of sources. At constant variance, one can indeed use a window of size T'<T to estimate the directions of arrival with respect to a search in dimension M.

Finally, once the maxima in each direction have been found, denoted $\hat{\Theta}_{1 \leq l \leq L}$ and $\hat{\varphi}_{1 \leq p \leq P}$ in the case of a spherical array, a selection step making use of the multi-dimensional histogram (of dimension M, in this example with M=2) as a probability measurement, makes it possible to determine the most relevant pairs $(\hat{\Theta}_l, \hat{\Theta}_p)$ (or M-tuples in the general case).

Different selection methods are conceivable, in order to facilitate the robustness or complexity of the selection.

An implementation for a spherical array is described below which allows obtaining a surround-sound type representation (or "ambisonic" as used below) of the sound field. However, the method can just as easily be applied to any other type of microphone array, at least 2D such as a rectangular grid, or even 3D (with distribution of the sensors within the volume): these are referred to as n-dimensional "acoustic arrays".

Figure 2:
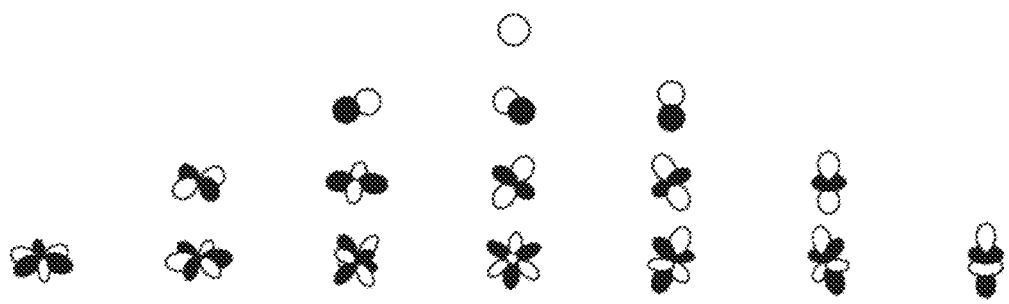
FIG. 2 illustrates spherical harmonic functions, here from order 0 (first row at the top: the sphere) to order 3 (last row at the bottom), with positive values being light and negative values being dark.

The ambisonic representation consists of a projection of the sound field onto a basis of spherical harmonic functions as illustrated in FIG. 2, to obtain a spatial representation of the sound scene. The function $Y_{mn}^\sigma(\theta, \varphi)$ is the spherical harmonic of order m and of index nσ, dependent on the spherical coordinates (θ, φ), defined with the following formula:

$$Y_{mn}^\sigma(\theta, \varphi) = \tilde{P}_{mn}(\cos\varphi) \cdot \begin{cases} \cos n\theta \; si \; \sigma = 1 \\ \sin n\theta \; si \; \sigma = -1 \; et \; n \geq 1 \end{cases}$$

where $\tilde{P}_{mn}(\cos \varphi)$ is a polar function involving the Legendre polynomial:

$$\tilde{P}_{mn}(x) = \sqrt{\epsilon_n \frac{(m-n)!}{(m+n)!}} (-1)^n (1-\cos^2 x)^{\frac{n}{2}} \frac{d^n}{dx^n} P_m(x) \text{ with}$$

$$\epsilon_0 = 1 \text{ and } \epsilon_0 = 2 \text{ for } n \geq 1 \text{ and } P_m(x) = \frac{1}{2^m \, m!} \frac{d^m}{dx^m}(x^2-1)^m$$

In theory, the ambisonic capture (for example in the SID/N3D normalization format), denoted y(t), of a source s(t) of incidence (θ, φ), propagating in a free field, is given by the following matrix product:

$$y(t) = [Y_{mn}^\sigma(\theta, \varphi)]_{m,n} \cdot s(t) = \begin{bmatrix} W \\ X(\theta, \varphi) \\ Y(\theta, \varphi) \\ Z(\theta, \varphi) \\ \vdots \end{bmatrix} = \begin{bmatrix} 1 \\ \sqrt{3} \cos\theta\cos\varphi \\ \sqrt{3} \sin\theta\cos\varphi \\ \sqrt{3} \sin\varphi \\ \vdots \end{bmatrix} s(t) \quad (1)$$

In this equation, the first four components (W, X, Y, Z), called "first order ambisonics" or "B-format", are directly related to the sound field:
W is the omnidirectional component and measures the sound field p(t), and the components X, Y and Z measure the pressure gradients oriented along the three spatial dimensions (corresponding to the first two rows of FIG. 2), and therefore measure the components of the particle velocity $\vec{v}(t)$.

The sound field p(t) and the particle velocity $\vec{v}(t)$ are two numbers which allow quantizing the sound field. In particular, their product represents the instantaneous flow of acoustic energy through an elementary surface, also called the sound intensity $\vec{I}(t)$:

$$\vec{I}(t) = p(t) \cdot \vec{v}(t) \quad (2)$$

We can show that, for a plane wave moving in a free field, this sound intensity vector $\vec{I}(t)$ is orthogonal to the wavefront and points in the direction of the source emitting the sound wave. Thus, the measurement of this vector makes it possible to directly estimate the "position" of the source from which the sound field originates (more precisely, in actuality the direction of arrival of the sound wave related to the emitting source).

By definition, first order ambisonics make it possible to directly estimate the sound intensity by multiplying the omnidirectional channel W by each of the pressure gradients (X,Y,Z):

$$\vec{I}(t) = W(t) \begin{bmatrix} X(t) \\ Y(t) \\ Z(t) \end{bmatrix} \quad (3)$$

In the theoretical case of a single sound wave propagating in air in a free field (with no obstacles), this sound intensity vector can be deduced directly from equations (1) and (3) as follows:

$$\vec{I}(t) = \begin{bmatrix} \sqrt{3}\cos\theta\cos\varphi \\ \sqrt{3}\sin\theta\cos\varphi \\ \sqrt{3}\sin\varphi \end{bmatrix} s^2(t) \quad (4)$$

From equation (4), we can easily derive the angles of incidence of the sound wave $(\theta,\varphi)$ from the following simple trigonometric relations:

$$\begin{cases} \theta = \arctan\left(\dfrac{WY}{WX}\right) \\ \varphi = \arctan\left(\dfrac{WZ}{\sqrt[2]{(WX)^2 + (WY)^2}}\right) \end{cases} \quad (5)$$

Generally, as the signals s(t) are random, the instantaneous intensity vector defined by equation (4) is particularly noisy because of the great variability of $s^2(t)$, which has the consequence of also adding noise to the estimation of the direction of arrival by equation (5). Also, in this case it may be preferable to base the estimates of the direction of arrival on an "average" intensity vector which has greater spatial stability:

$$\begin{cases} \theta = \arctan\left(\dfrac{E\{WY\}}{E\{WX\}}\right) \\ \varphi = \arctan\left(\dfrac{E\{WZ\}}{\sqrt[2]{E(WX)^2 + E(WY)^2}}\right) \end{cases} \quad (6)$$

where $E\{\ \}$ is the "expectation" operator. In practice, this expectation is calculated, applying the ergodicity hypothesis, by averaging different time samples over a window whose size is a compromise between the desired responsiveness of the system and the variance of the estimation.

In the case of a field generated by several simultaneous sources, the superposition theorem (fields associated with each source summed to form the total field) implies that the sound intensity is a weighted mixture of equations (4).

However, in principle this mixture never corresponds to the encoding of a plane wave (except in a very special case where all sources are coming from the same direction, or where one source has much more energy than the others). Also, to attempt a best estimate of the direction of arrival of the different sound waves, we take advantage of the frequency parsimony of the sound sources, which assumes that, in the short term, the sources have disjoint frequency supports.

This assumption is valid as long as the number of sources is not too large, and in a large number of frequency bands there is a preponderant source which "imposes" its direction of arrival.

In practice, the ambisonic signal can then be broken down into a succession of frames to which a time-frequency transformation is applied, generally a Fast Fourier Transform (denoted "FFT" below) such that:

$$Y(n, f) = \sum_{t=0}^{T-1} \begin{pmatrix} win(t) \cdot W(n, t) \\ win(t) \cdot X(n, t) \\ win(t) \cdot Y(n, t) \\ win(t) \cdot Z(n, t) \\ \vdots \end{pmatrix} e^{-2i\pi ft} \quad (7)$$

where n is the frame number and t is the index of the sample in frame n, T is the size of the frame in samples, and win(t) is an apodization window (typically a Hann or Hamming window).

The choice of frame size depends on the stationarity duration of the analyzed signals: frames lasting a few tens of milliseconds (typically 10 to 50 ms for speech signals) will be chosen.

We assume here that the variables p(t) and $\vec{v}(t)$ follow a narrow-band model, of the type: $p(t)=p\cos(2\pi ft+a_p)$ and $\vec{v}(t)=\vec{v}\cos(2\pi ft+a_v)$.

Under this formalism, we show that the real part of the sound intensity (also called "active intensity"), therefore in the frequency domain, carries the sound field propagation information, and is expressed as a function of the ambisonic components according to the following equation:

$$I(n, f) = \frac{1}{2}\Re\{p\vec{v}^*\} = \frac{1}{2}\Re\left\{W(n, f)\begin{bmatrix} X^*(n, f) \\ Y^*(n, f) \\ Z^*(n, f) \end{bmatrix}\right\} \quad (8)$$

where $\Re\{.\}$ denotes the real part of a complex number.

If we assume perfect parsimony (the frequency supports of the signals then being disjoint), only one source is active in each frequency band, the sound intensity of this source being representative of its spatial encoding. The direction of arrival of the predominant source can then be determined in each frequency band from equations (5) and (8):

$$\begin{cases} \theta(n,f) = \arctan\left(\frac{R\{W^*Y\}}{R\{W^*X\}}(n,f)\right) \\ \varphi(n,f) = \arctan\left(\frac{R\{W^*Z\}}{\sqrt[2]{R\{W^*X\}^2 + R\{W^*Y\}^2}}(n,f)\right) \end{cases} \quad (9)$$

Thus, for a given series of n frames, we obtain a collection of pairs of angles $\{(\theta(n,f),\varphi(n,f))\}_{n_0 \leq n < n_0+N, f_{min} \leq f \leq f_{max}}$ from which we construct a histogram $h(\theta_l, \varphi_p)$ representative of the distribution of the angles of arrival of the observed field.

Quantization of the 3D sphere $(\theta_l, \varphi_p)$ may be carried out in different ways, for example on a "rectangular" basis such as:

$$h(\theta_l, \varphi_p) = \underset{n,f}{\mathrm{card}} \quad (10)$$

$$((\theta, \varphi)(n,f)) / \begin{cases} -\pi + l\frac{2\pi}{L} \leq \theta(n,f) < -\pi + (l+1)\frac{2\pi}{L}, & 0 \leq l < L \\ -\frac{\pi}{2} + p\frac{\pi}{P} \leq \varphi(n,f) < -\frac{\pi}{2} + (p+1)\frac{\pi}{P}, & 0 \leq p < P \end{cases}$$

In the ideal case of point sources with disjoint frequency supports propagating in a free or anechoic field (no reflection), the distribution of these angles is theoretically purely "sparse": a peak is observed at each of the spatial positions corresponding to the directions of arrival of each source.

On the other hand, in a real acoustic environment with reflective walls, each source can generate a complex sound field composed of a very large number of reflections and a diffuse field, components which depend on the nature of the walls and the dimensions of the acoustic environment. These reflections and diffuse field can be viewed as an infinity of secondary sources of energy and of variable directions of arrival, the main consequence being that the encoding of each source no longer exactly follows equation (4), but a noisy version of this equation.

In a real situation, the intensity vector $I(n,f)$ effectively points in the direction of the preponderant source in band $f$, but only "on average".

Figure 3:
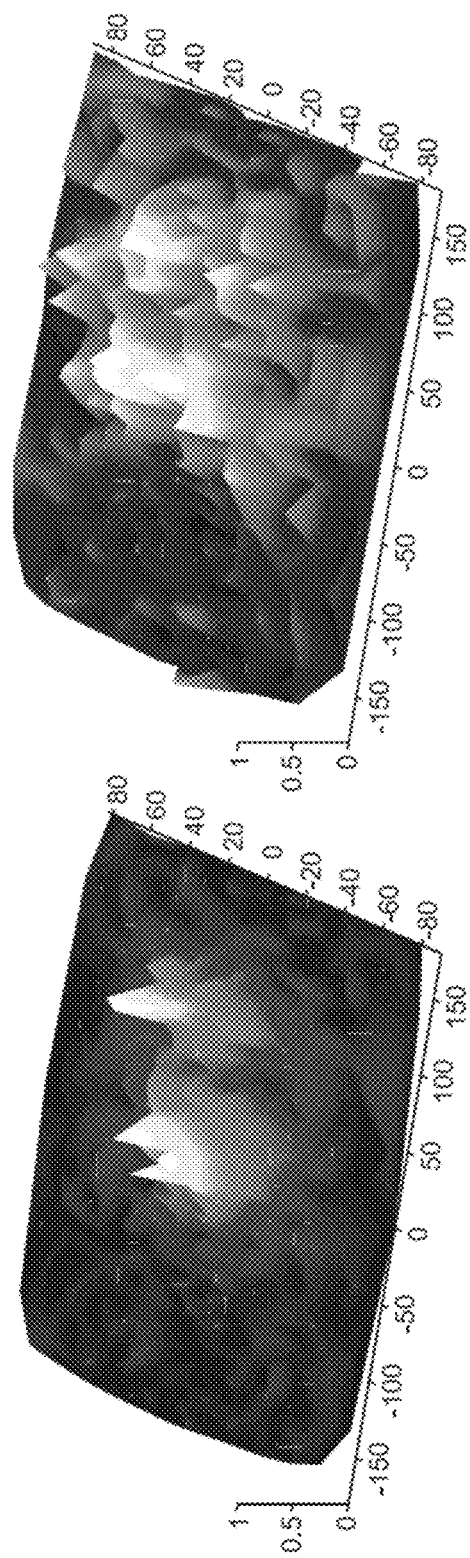
FIG. 3 represents the acoustic activity map illustrating the directions of arrival (Θ(n,f), φ(n,f)), here in the case of two sources at positions (0,0) and (90,10) for two different acoustics (reverberation rate TR60 of duration 0.375 and 0.7 s)

FIG. 3 represents a histogram of the angles of arrival $h(\theta, \varphi)$. We observe a distribution of these angles around the position of the sources, with a greater or lesser variance depending on the acoustic nature of the location (here, more or less reflective walls).

The histogram given by equation (10) is noisy in practice, especially in low energy areas where reverberation is predominant. This reverberation can be viewed as a stationary field coming from no particular direction. In terms of direction of arrival, it manifests as diffuse noise. To limit the influence of this diffuse field, a weighting proportional to the energy in the frequency band considered can be applied, as follows:

$$\tilde{h}(\theta_l, \varphi_p) = \quad (11)$$

$$\sum_{n,f} g(W(n,f)) / \begin{cases} -\pi + l\frac{2\pi}{L} \leq \theta(n,f) < -\pi + (l+1)\frac{2\pi}{L}, & 0 \leq l < L \\ -\frac{\pi}{2} + p\frac{\pi}{P} \leq \varphi(n,f) < -\frac{\pi}{2} + (p+1)\frac{\pi}{P}, & 0 \leq p < P \end{cases}$$

where $g(x)$ is generally a positive and monotonic function over the half-spaces $x \leq 0$ (decreasing) and $x \geq 0$ (increasing): for example $|x|$, $x^2$, or the energy in logarithmic scale $10 \cdot \log(1+x^2)$.

This allows priority to be given to high energy frequency bands, generally indicative of the presence of a moving sound wave.

Another way to weight the histogram (or map projection) is to take into account the diffuse nature of the field in this frequency band. In ambisonic processing, it is common to define the diffuse nature of a sound field by its resemblance (or dissimilarity) to a plane wave given by equation (1). If we define the following criterion $c_{op}$:

$$c_{op} = \frac{X^2 + Y^2 + Z^2}{3W^2} \quad (12)$$

this criterion is equal to 1 for a field generated by a plane wave propagating in a free field, and deviates from 1 if the wave is not a plane wave: this is notably the case in the presence of several plane waves or significant reverberation. We can also weight the histogram by this criterion:

$$\tilde{h}(\theta_l, \varphi_p) = \quad (13)$$

$$\sum_{n,f} r(c_{op}(n,f)) / \begin{cases} -\pi + l\frac{2\pi}{L} \leq \theta(n,f) < -\pi + (l+1)\frac{2\pi}{L}, & 0 \leq l < L \\ -\frac{\pi}{2} + p\frac{\pi}{P} \leq \varphi(n,f) < -\frac{\pi}{2} + (p+1)\frac{\pi}{P}, & 0 \leq p < P \end{cases}$$

where $r(x)$ is a function measuring the deviation from 1. We can choose for example a Gaussian centered at 1, in other words $$r(x) = e^{-\frac{(x-1)^2}{\sigma^2}},$$

where parameter $\sigma^2$ is chosen as a function of the dispersion of $c_{op}$ in the presence of reverberation.

This weighting makes it possible to exclude the time-frequency moments where the field is diffuse and does not give reliable information on the presence of a directional wave.

In another implementation, we can weight the histogram by a combination of energy $g(W)$ and plane wave $r(c_{op})$ criteria, or any other criterion making it possible to measure the directionality of the observed field.

Next, the detection and localization of sources consists of a regrouping or "clustering" processing of this distribution $\tilde{h}(\theta_l, \varphi_p)$ in this 2D space $(\theta, \varphi)$, the center of the groups or "clusters" representing the position of the sources.

Here, one implementation consists of projecting this histogram along axes $\theta$ and $\varphi$ to construct 1D histograms $h_\theta$ and $h_\varphi$ as follows:

$$\begin{cases} h_\theta(\theta_l) = \underset{\varphi_p}{E}\{\tilde{h}(\theta_l, \varphi_p)\} \\ h_\varphi(\varphi_p) = \underset{\theta_l}{E}\{\tilde{h}(\theta_l, \varphi_p)\} \end{cases} \quad (14)$$

where $$E(\cdot)_x$$

is the "expectation" operator of variable x. The search for sources and their positions then consists of searching for the local maxima in histograms $h_\theta$ and $h_\varphi$.

The search for local maxima may be carried out in different ways. We can proceed by an analytical approach, performing a search for local maxima in each of the 1D histograms. As the 1D histograms are generally noisy in the presence of reverberation, a filter, preferably low-pass, is first applied to each of the histograms to avoid the detection of multiple sources:

$$\begin{cases} \tilde{h}_\theta(\ ) = f_\theta * h_\theta(\ ) \\ \tilde{h}_\varphi(\ ) = f_\varphi * h_\varphi(\ ) \end{cases} \quad (15)$$

where the parameters of the filters $f_\theta$ and $f_\varphi$, namely cutoff frequency and length, may be different depending on the dimensions.

As the azimuth is a circular variable of period $2\pi$, it is of interest to apply a circular convolution rather than a classical convolution to avoid filtering problems at the ends, which can be calculated by FFT to reduce the complexity.

The search for maxima can also proceed by a probabilistic approach, considering the histograms as a mixture of variables which follow a given law of probability. According to this law, the parameters representative of the position of the sources are sought. Conventionally, we can consider the histograms as a mixture of Gaussians (or "GMM" for Gaussian Mixture Model), or von Mises distributions more suited to cyclic variables such as the azimuth. By an Expectation-Maximization type of iterative approach, we seek to minimize a probabilistic distance, thus typically finding the maximum likelihood, in order to estimate the parameters of each distribution, of which the averages provide the position of the sources.

This search then produces two sets of angles in each direction:

$$\begin{cases} \{\hat{\theta}_k\}_{1 \leq k \leq K} \\ \{\hat{\varphi}_q\}_{1 \leq q \leq Q} \end{cases}$$

Figure 4:
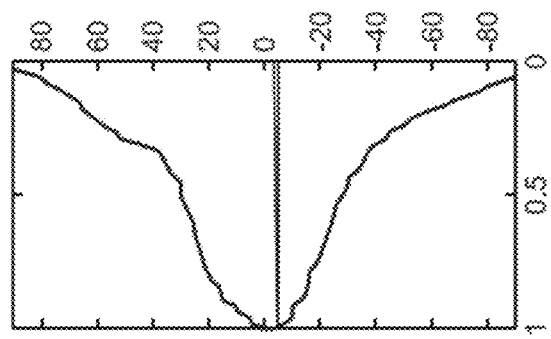
FIG. 4 illustrates:
at the top left: the map projected in 2D in the vector basis h(θ_l, φ_p), (azimuth on the x axis—elevation on the y axis);
at the bottom: a histogram corresponding to a 1D projection of the map on the azimuth angle basis h_θ;
on the right: a histogram corresponding to a 1D projection of the map on the elevation angle basis h_φ.
Figure 4:
Figure 4:
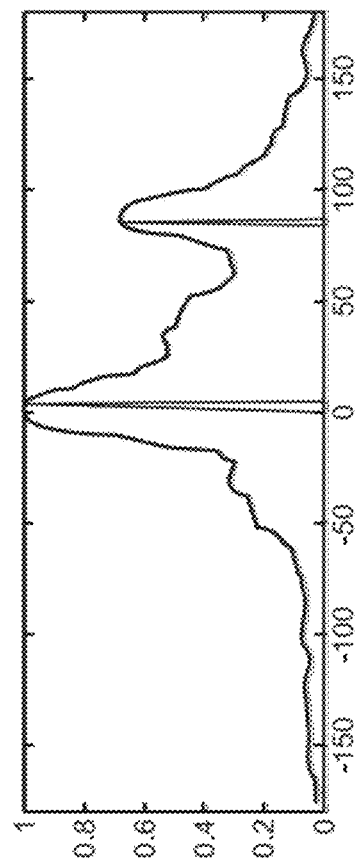

FIG. 4 shows an example of histograms obtained in the presence of two sources at positions (0,0) and (90,10), in a moderately reverberant room (TR60 of 0.375 seconds: here, "TR60" is defined as the time necessary for late reflections to undergo an attenuation of 60 dB compared to the first reflections).

The search produces sets $\{\hat{\theta}_k\}=\{6,90\}$ (K=2) and $\{\hat{\varphi}_q\}=\{-6\}$ (Q=1), thus characterizing the number of peaks observed on axes $\theta$ (2 peaks) and $\varphi$ (1 peak).

From these sets of angles, a next step consists of recreating the U pairs of angles $\{\hat{\theta}_u, \hat{\varphi}_u\}$, $1 \leq u \leq U$ localizing the sources present in the sound field by associating an azimuth $\hat{\theta}_k$ with an elevation $\hat{\varphi}_q$. In the example given here, the number of sources U is given by:

$$U=\max(K,Q)$$

For this search for pairs, a preferred direction is selected, generally the one with the most sources detected. In the case of FIG. 4, this is the dimension of the azimuths. The search for pairs uses the 2D histogram as a measure of relevance. In a first approach, for each $\hat{\theta}_k$, the set of elevations detected is searched for the elevation $\hat{\theta}_{k'}$ having the highest probability, this probability expressed by $\tilde{h}(\theta, \varphi)$, i.e.:

$$\forall k \in \{1, \ldots, K\}, (\hat{\theta}_k, \hat{\varphi}_{k'})/k' = \arg\left(\max_{q \in \{1..Q\}} (\tilde{h}(\hat{\theta}_k, \hat{\varphi}_q))\right) \quad (16)$$

In the case proposed in FIG. 4, this amounts to forming the pairs of sources:

(6,−6), and (90,−6).

In this approach, one will note a bias towards the theoretical positions (0,0) and (90,10), particularly in elevation. Because of reverberation and the fact that the elevations of the different sources are, in practice, relatively close (sound sources such as voice or instruments are usually at similar heights), the projection mixes the distributions of the different sources, making it difficult to detect multiple sources.

To improve robustness and reduce this localization bias, another more complex approach consists of ignoring the elevations detected, but exhaustively searching in a slice around $\hat{\theta}_k$ for the pair $(\hat{\theta}_{k''}, \hat{\theta}_{k'})$ which maximizes $\tilde{h}(\theta, \varphi)$, i.e.:

$$\forall k \in \{1, \ldots, K\}, (\hat{\theta}_{k''}, \hat{\varphi}_{k'})/(k'', k') = \arg\left(\max_{k-\Delta \leq l \leq k+\Delta, 1 \leq p \leq P} (\tilde{h}(\theta_l, \varphi_p))\right) \quad (17)$$

where $\Delta$ fixes the neighborhood quantized around the detected azimuth.

In practice, we can allow ourselves a neighborhood of about ten degrees, or even more. Although slightly more complex than the previous approach given by equation (16), this approach ensures that the local maximum in 2D is properly detected. In the proposed case of FIG. 4, this amounts to forming the pairs (0,−6) and (90,15), which makes it possible to reduce the bias compared to the previous approach.

In the case where the number of sources detected is equal in each direction (and greater than or equal to two), therefore with K=Q, the selection of the preferred axis cannot be made according to the number of sources. In this case, a first approach consists of finding the most probable combination of pairs $\{(\hat{\theta}_k, \hat{\varphi}_{k'})\}$. This amounts to finding the permutation perm in the set $\{1, \ldots, K\}$ which maximizes a probability measurement, for example the norm L1 of measurement $\tilde{h}(\ )$:

$$perm_\varphi = \arg\left(\max_{perm_\varphi}\left(\sum_{k=1}^{K} \tilde{h}(\hat{\theta}_k, \hat{\varphi}_{perm_\varphi(k)})\right)\right)$$

The set of detected sources is then $\{(\hat{\theta}_k, \hat{\varphi}_{perm_\varphi(k)})\}_{k \in \{1, \ldots, N\}}$.

In another embodiment, the preferred axis can be selected as the one with the least "flat" shape, meaning the distribution with the most easily detectable local maxima. This approach makes it possible to select the distribution which is the least sensitive to reverberation and which a priori has the lowest localization bias. In practice, we can use a measurement derived from the spectral flatness given by the ratio between the geometric mean and the arithmetic mean of a random variable X:

$$\text{flatness}(X) = \frac{\sqrt[S]{\prod_{s=1}^{S} x_s}}{\frac{1}{S}\sum_{s=1}^{S} x_s} \quad (18)$$

where $(x_1, \ldots, x_s)$ are samples of variable X.

This measurement, generally used to measure the tonal character of a sound signal based on its spectrum, makes it possible to quantize the concentration of the values of samples of variable X, which amounts to giving a measurement of the "flatness" of the distribution of variable X. A value close to 1 indicates a perfectly flat variable (case of uniform white noise), while a value close to 0 indicates a variable concentrated at a few values (0 for a Dirac). In one embodiment of the invention, in the case where an equal number of angles is found in each direction, the preferred axis having the lowest flatness for example is chosen, and the search for pairs is then carried out according to equation (16) or (17), depending on the mode selected.

In a simplified implementation, we can select the azimuth as the preferred axis because:
- the sources statistically show more pronounced azimuth differences,
- azimuth suffers less bias due to the more isotropic distribution around the direction of arrival, and
- elevation, due to the strong reflection on the ground, often presents a more spread out distribution with a bias towards lower elevations.

Finally, the flatness measurement may also be a criterion for deciding whether or not point sources are present in the mixture. Indeed, the methods described usually detect one or more local maxima, although the field may be completely diffuse and contain no propagating waves. The flatness measurement allows characterizing diffuse environments, and serving as a detection of sound activity. It is therefore a reliable assistance in detecting the presence or absence of sources in the sound field, which allows subsequently triggering the identification of source positions.

Figure 5:
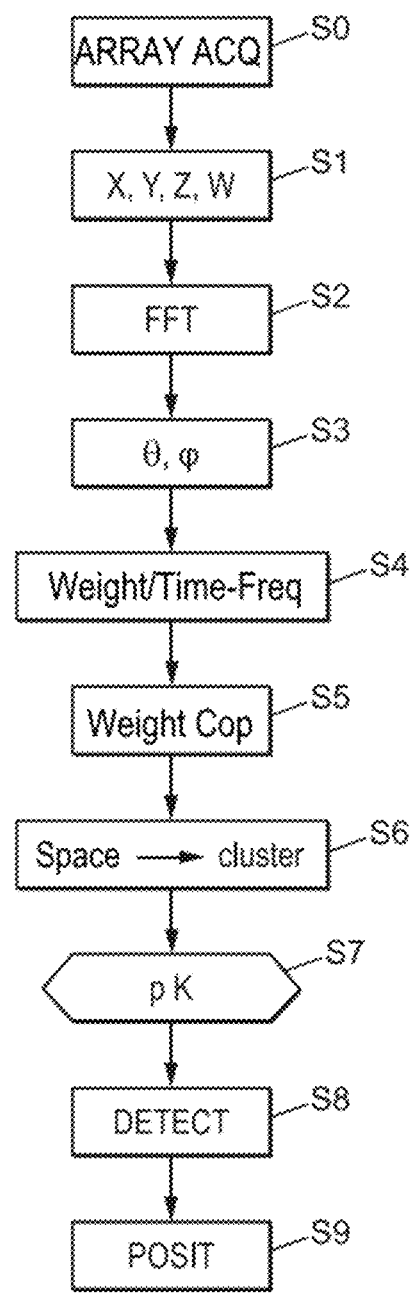
FIG. 5 illustrates an example summarizing a processing within the meaning of the invention.

The steps of the method in the exemplary embodiment given above are summarized in FIG. 5. During a first step S0, the microphone array acquires signals in the form of successive frames, captured in the acoustic environment. Preferably, the microphones can be arranged in the array in a manner suitable for an ambisonic representation of the sound scene, and the first order components X, Y, Z, W, can be deduced therefrom in step S. Then, a fast Fourier transform of the FFT type is applied to these signals in step S2. In the example illustrated above, we have chosen a two-dimensional vector basis, in azimuth and in elevation, to perform the projection of the acoustic activity map (step S3). Following the same formalism, this embodiment can be applied directly to any array producing a representation of the sound field and its main characteristics: this is notably the case of planar arrays and associated acoustic holography techniques which allow estimating certain numbers such as the pressure field and the particle velocity which lead to the sound intensity vector. It would also be possible, with certain acoustic arrays, to obtain a representation in a 3D vector basis: for example in radius r, in azimuth, and in elevation, to make projections of the map onto each corresponding axis r, then azimuth, then elevation. Such an implementation would make it possible to further enrich detection and localization (while losing simplicity in the processing, with three projection coordinates to be processed instead of the previous two). Once the acoustic activity map is represented by its projections on the "azimuth" and "elevation" axes of the vector basis in step S3, a weighting can be applied in step S4 to give greater importance to higher energy frames ("time weighting") or to give greater importance to higher energy frequency bands (after application of the FFT and decomposition into sub-bands) ("frequency weighting").

Weighting may also be applied in step S5 to facilitate detection of plane wave propagation according to the above-mentioned criterion Cop. Then the search for a local maximum in the map projection(s) can be implemented in step S6 with the clustering technique. If a peak is identified in step S7 (for example in the most robust projection along the azimuth angle as explained above), it is possible, after this detection step S8, to proceed to a more refined search for the position of the source(s) around this azimuth position, in the following step S9.

Next, identification of the position of one or more sources can increase the virtual reality of a rendering. For example in the case of a videoconference, it may be advantageous to zoom in on an image of a speaking party, to his or her face, which can then be detected as the position of a sound source (the mouth).

Figure 6:
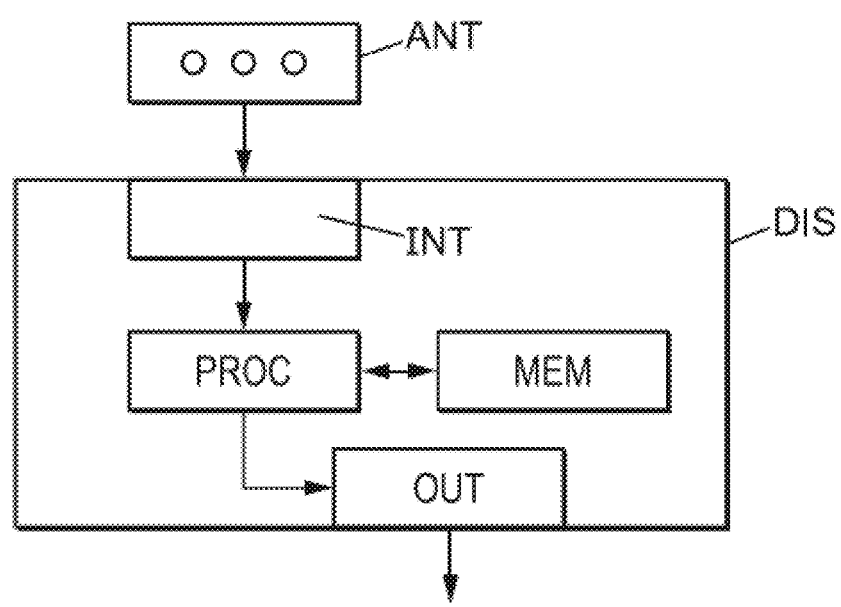
FIG. 6 illustrates a processing unit UT of a device within the meaning of the invention.

FIG. 6 very schematically illustrates a device DIS for implementing the above method. In particular, the device comprises:
- an input interface INT suitable for receiving signals from the microphone array ANT,
- a processing unit comprising:
  - a memory MEM suitable for storing instruction data of a computer program in the meaning of the invention, and possibly other data, temporary or not temporary, for the implementation of the above method, and
  - a processor PROC capable of working with the memory MEM and with the input interface INT to read the program instructions in the memory MEM and to apply the method described above, and
- an output interface OUT, for example for delivering a signal characterizing the presence of a source and possibly its position in the sound environment.

Although the present disclosure has been described with reference to one or more examples, workers skilled in the art will recognize that changes may be made in form and detail without departing from the scope of the disclosure and/or the appended claims.

The invention claimed is:

1. A method for processing acoustic signals in order to detect one or more sound sources in a sound scene, the method being implemented by a device and comprising:
   - obtaining a plurality of signals representative of the sound scene, captured by a plurality of microphones of predefined positions,
   - based on the signals captured by the microphones and on the positions of the microphones, applying a quantization of directional measurements of sound intensity and establishing a corresponding acoustic activity map in a sound source localization space, said space being of dimension N,
   - constructing at least one vector basis of dimension less than N,
   - projecting the acoustic activity map onto at least one axis of the vector basis,
   - searching for at least one local peak of acoustic activity in the map projection, and
   - in response to a local peak being identified, assigning to the identification of said identified local peak a sound source present in the scene and outputting at least one source detection signal indicating the sound source being present in the sound scene.

2. The method according to claim 1, wherein the signals are obtained over successive frames having each a duration corresponding to a predetermined observation period, and wherein the establishment of the acoustic activity map comprises:
   collecting indices of several consecutive frames, and
   quantizing said indices on a grid of the N-dimensional space.

3. The method of claim 2, wherein the observation period is between 10 and 50 MS.

4. The method according to claim 1, wherein the search for a local peak of acoustic activity in the map projection comprises:
   processing the map projection using a clustering technique, and
   identifying cluster centers as positions of sources.

5. The method according to claim 1, further comprising:
   from at least one coordinate of the local peak, estimating in the vector basis at least a first direction of arrival of the sound coming from the sound source corresponding to the local peak.

6. The method according to claim 5, further comprising:
   from the coordinate of the local peak in the vector basis, refining the estimate of the direction of arrival of the sound by processing the acoustic activity map in only one sector of the N-dimensional space, including said first direction of arrival.

7. The method according to claim 1, comprising subdividing the signals captured by the microphones, into frequency sub-bands.

8. The method according to claim 1, further comprising applying a weighting to the quantization of the directional measurements of sound intensity, in a manner proportional to an acoustic energy estimated for each measurement to be quantized.

9. The method according to claim 2, comprising applying a weighting to the quantization of the directional measurements of sound intensity, in a manner proportional to an acoustic energy estimated for each measurement to be quantized, and wherein an acoustic energy per frame is estimated and a weighting of higher weight is applied to the quantization of directional measurements of sound intensity coming from the frames having the most energy.

10. The method according to claim 8, comprising subdividing the signals captured by the microphones, into frequency sub-bands, and wherein an energy is estimated per sub-band in order to identify sub-bands having the most acoustic energy and wherein a weighting of higher weight is applied to the quantization of directional measurements of sound intensity having a greater representation in said sub-bands having the most energy.

11. The method according to claim 1, wherein the microphones are arranged to capture sound signals defined in a basis of spherical harmonics in an ambisonic representation, and the method comprises constructing at least one vector basis of dimension one, among:
   a first basis defining values of an azimuth angle of the direction of arrival of the sound, and comprising an azimuth angle axis onto which the acoustic activity map is projected, and
   a second basis defining values of an elevation angle of the direction of arrival of the sound, and comprising an elevation angle axis onto which the acoustic activity map is projected.

12. The method according to claim 11, wherein the ambisonic representation comprises at least the first order, and wherein the azimuth and elevation angles are respectively defined as a function of a four first-order ambisonic components denoted W, X, Y, Z, as follows:

$$\begin{cases} \theta = \arctan\left(\dfrac{f(WY^*)}{f(WX^*)}\right) \\ \varphi = \arctan\left(\dfrac{g(WZ^*)}{\sqrt[2]{\|g(WX^*)\|^2 + \|g(WY^*)\|^2}}\right) \end{cases} \quad (5)$$

$f$ and $g$ being possible functions among: identity, statistical expectation, the real part of a complex number, and a combination of some at least of these functions.

13. Method according to claim 12, wherein a planarity criterion for a sound wave coming from a source is estimated as a function of the ambisonic components X, Y, Z and W:

$$c_{op} = \frac{f(\|X\|^2) + f(\|Y\|^2) + f(\|Z\|^2)}{3f(\|W\|^2)}$$

and wherein the method further comprises an application of a weighting to the quantization of the directional measurements of sound intensity, in a manner proportional to the planarity criterion $c_{op}$ for each measurement to be quantized.

14. The method according to claim 11, comprising:
   from at least one coordinate of the local peak, estimating in the vector basis at least a first direction of arrival of the sound coming from the sound source corresponding to the local peak, and
   wherein the estimation of the direction of arrival of the sound is refined based on the coordinate of the local peak identified in the first basis defining the azimuth angle values.

15. The method according to claim 1, comprising applying a low-pass frequency filter to the projection of the acoustic activity map.

16. A non-transitory computer storage medium, storing instructions of a computer program causing implementation of a method for processing acoustic signals in order to detect one or more sound sources in a sound scene, when said instructions are executed by a processor of a device, wherein the instructions configure the device to:
   obtain a plurality of signals representative of the sound scene, captured by a plurality of microphones of predefined positions,
   based on the signals captured by the microphones and on the positions of the microphones, apply a quantization of directional measurements of sound intensity and establishing a corresponding acoustic activity map in a sound source localization space, said space being of dimension N,
   construct at least one vector basis of dimension less than N,
   project the acoustic activity map onto at least one axis of the vector basis,
   search for at least one local peak of acoustic activity in the map projection, and
   in response to a local peak being identified, assign to the identification of said identified local peak a sound source present in the scene and output at least one source detection signal indicating the sound being present in the sound scene.

17. A device comprising:
an input interface for receiving signals captured by microphones of predetermined positions,
a processing unit,
a non-transitory computer-readable medium comprising instructions stored thereon which when executed by the processor configure the device to process acoustic signals in order to detect one or more sound sources in a sound scene, by:
  obtaining a plurality of the signals representative of the sound scene, captured by the microphones of predefined positions,
  based on the signals captured by the microphones and on the positions of the microphones, applying a quantization of directional measurements of sound intensity and establishing a corresponding acoustic activity map in a sound source localization space, said space being of dimension N,
  constructing at least one vector basis of dimension less than N,
  projecting the acoustic activity map onto at least one axis of the vector basis,
  searching for at least one local peak of acoustic activity in the map projection, and
  in response to a local peak being identified, assigning to the identification of said identified local peak a sound source present in the scene, and
an output interface for delivering at least one source detection signal.

\* \* \* \* \*